United States Patent [19]

Rhodes

[11] Patent Number: 4,466,108
[45] Date of Patent: Aug. 14, 1984

[54] TDMA/PSK CARRIER SYNCHRONIZATION WITHOUT PREAMBLE

[75] Inventor: Smith A. Rhodes, Falls Church, Va.

[73] Assignee: Communications Satellite Corporation, Washington, D.C.

[21] Appl. No.: 309,136

[22] Filed: Oct. 6, 1981

[51] Int. Cl.³ .............................................. H04L 27/22
[52] U.S. Cl. ........................................ 375/83; 375/97; 375/118; 329/112
[58] Field of Search ......................... 375/39, 52, 54, 81, 375/83, 85, 86, 97, 118; 329/50, 104, 105, 122, 124, 112; 370/93, 108

[56] References Cited

U.S. PATENT DOCUMENTS

| | | | |
|---|---|---|---|
| 3,818,347 | 6/1974 | Holsinger | 375/39 |
| 3,990,016 | 11/1976 | Dimon | 329/124 |
| 4,034,305 | 7/1977 | Sato | 375/39 |
| 4,313,205 | 1/1982 | Rhodes | 375/86 |
| 4,355,404 | 10/1982 | Uzunoglo | 375/86 |

OTHER PUBLICATIONS

Nosaka et al., "PSK Demodulator with Delay Line for the PCM-TDMA System", Aug. 1970, IEEE Transactions on Communication Technology, vol. COM-18, No. 4.

Primary Examiner—Robert L. Griffin
Assistant Examiner—Stephen Chin
Attorney, Agent, or Firm—Sughrue, Mion, Zinn, Macpeak and Seas

[57] ABSTRACT

An apparatus for providing coherent detection of a series of data bursts without a preamble by providing a reference waveform which has the same frequency as the carrier for a received TDMA/MPSK transmission, but having an arbitrary phase with respect to such signals. The reference waveform is used for pseudo-coherent demodulation. Symbol timing is available at all times by using symbol synchronization obtained from the previous bursts of the same transmission. The symbol timing is used to sample two quadrature outputs of the pseudo-coherent demodulator once per MPSK symbol interval. Storage of a sufficient number of demodulator samples allows a carrier phase estimate to be obtained from the message burst itself. The carrier phase estimate is then used for coherent detection on a delayed sequence of the demodulator samples.

16 Claims, 4 Drawing Figures

TDMA/PSK CARRIER SYNCHRONIZATION WITHOUT PREAMBLE

FIELD OF THE INVENTION

The present invention is in the field of digital satellite communication systems and more particularly in a system and method for obtaining coherent communications performance in a digital satellite communications system which employs time division multiple access (TDMA) and M'ary phase shift keying (MPSK) as the modulation technique.

BACKGROUND OF THE INVENTION

Coherent detection of a digital message burst in TDMA communications systems requires an estimation of carrier phase and symbol timing of the received transmission. Carrier phase synchronization for TDMA transmissions may typically be provided at the receiver either by gated-tracking over successive bursts of the desired signal or by independent acquisition of carrier phase and symbol timing for each of the separate bursts.

Frequency instability in either the transmitter or receiver portions of the system may not allow the frame-to-frame coherence of carrier phase that is necessary for the gated tracking technique, in which case the carrier phase and symbol timing estimate is updated for each TDMA frame when the signal burst is received. Systems which independently acquire the carrier phase for each received transmission burst require a carrier synchronization preamble at the beginning of each burst. The use of such preambles results in a loss of frame efficiency, inasmuch as time and satellite power is utilized for purposes other than message transmission.

The TDMA/QPSK (Quaternary Phase Shift Keyed) system developed by Kokusai Denshin Denwa Company acquires carrier synchronization independently from burst to burst without the requirement of a carrier preamble. See K. Nosaka, A. Ogawa, and T. Muratani, "PSK-Demodulator with delay line for PCM-TDMA system", *Proceedings of 1969 International Communications Conference,* Boulder, Colo., pages 37:19–254. In that design, a temperature controlled co-axial cable of 100 meters in length was utilized for a highly precise delay of 25 symbol intervals. The 50Mbs modem obtained carrier synchronization from the undelayed IF signal in order to coherently demodulate the delayed replica of the suppressed carrier QPSK signal. Because of the cost and complexity of the IF delay implementation, this method may be impractical for most TDMA systems.

SUMMARY OF THE INVENTION

It is therefore an object of the present invention to provide a method and apparatus for coherent detection of TDMA signals wherein base-band storage and processing are utilized to estimate the carrier phase independently for each TDMA burst without the use of carrier synchronization preambles.

It is a further object of the present invention to avoid the problems associated with the above mentioned IF delay implementation by performing the equivalent delay function at base band, rather than at IF, whereby each previous sample of the pseudo-coherent modulator corresponds to a delay of one digital symbol interval.

In accordance with the present invention carrier phase synchronization without a preamble is achieved by providing a reference waveform which has the same frequency as the carrier for the received TDMA/MPSK transmission, but having an arbitrary phase with respect thereto. The reference waveform is used for pseudo-coherent demodulation. Symbol timing is assumed to be available at all times by using symbol synchronization obtained from previous bursts of the same transmission. The symbol timing is used to sample two quadrature outputs of the pseudo-coherent demodulator once per MPSK symbol interval. Storage of a sufficient number of demodulator samples allows a carrier phase estimate to be obtained from the message burst itself. The carrier phase estimate is then used for coherent detection on a delayed sequence of the demodulator samples.

The demodulator in accordance with the present invention requires a reference wave-form which has the same frequency as the carrier of the received transmission. If long term frequency stability is not sufficient to allow a free running oscillator to provide the reference frequency, some form of automatic frequency control must be employed to provide the reference wave-form. It is therefore a further object of the present invention to provide a frequency synchronizer which provides automatic frequency control in a discrete implementation that utilizes the demodulator samples as inputs.

The subject invention further provides a technique for providing the necessary symbol synchronization for sampling the demodulator outputs at the correct points in time. The technique according to the present invention converts continuous signals into discrete samples which can be processed by digital techniques. The necessary symbol timing is acquired from previous bursts of the same TDMA/MPSK transmitter. In the proposed inertial technique of symbol synchronization, a gated phase locked loop approach is employed. For each TDMA/MPS transmission, symbol phase is updated once per TDMA frame, then "flywheeled" through the frame until the next burst of the same transmission arrives.

DETAILED DESCRIPTION OF THE INVENTION

Phase shift keying (PSK) is the primary form of signaling which is presently under consideration for future digital satellite communications. Without a synchronization preamble, the receiver must reconstruct carrier phase information from the demodulated PSK transmission. Fully modulated transmissions are assumed for power efficiency, thereby completely suppressing the carrier. Therefore, the modulation must be removed by baseband processing in order to estimate the carrier phase.

Figure 1:
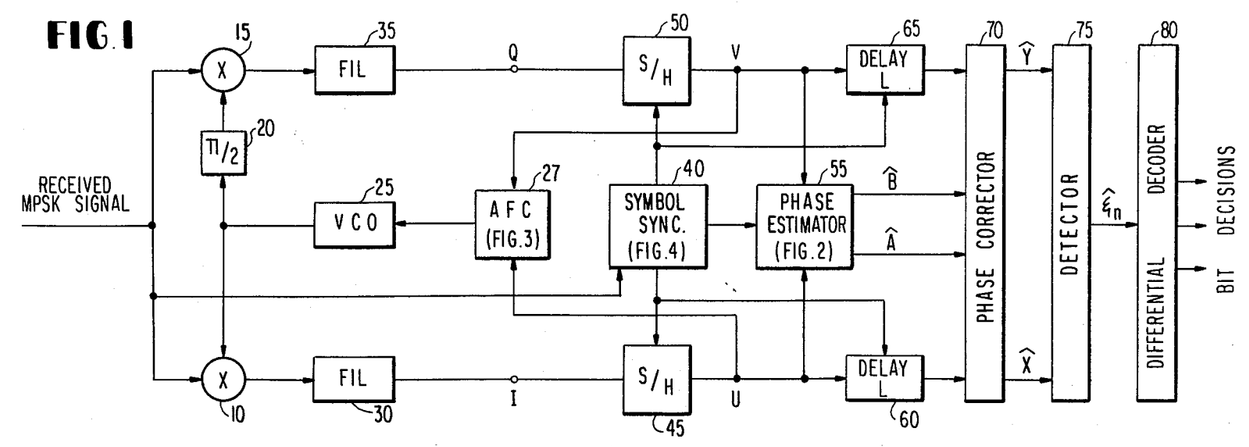
FIG. 1 is a block diagram of the TDMA/MPSK receiver in accordance with the present invention.

Referring to FIG. 1, an M-state PSK (MPSK) signal is received at mixers 10 and 15 where it is demodulated to base-band in phase-quadrature. A pseudo-coherent reference is provided by voltage controlled oscillator 25. The output of the VCO 25 is applied directly to mixer 10 and to mixer 15 through a 90° phase shifter 20. "Pseudo-coherent" refers to the use of a coherent configuration in which the reference waveform has the same frequency as the carrier but at an arbitrary phase. This arbitrary phase is assumed to be quasi-stationary over the burst duration whereby the phase error in demodulation will be virtually constant for any burst interval.

The in-phase and quadrature signals are delivered from filters 30 and 35 to sample and hold circuits 45 and 50 respectively. Since the digital signaling rate (symbols per second) is considerably smaller than the carrier frequency, frame to frame coherence of symbol timing is easily achieved. Symbol timing may therefore be derived from the TDMA transmission by gated tracking of the symbol transitions which occur during the TDMA burst.

The symbol timing provided by synchronizer 40 is used to sample the demodulator outputs in sample and hold circuits 45 and 50 once per symbol interval. The quadrature samples U and V can be used to define the vector $W = U + jV$. Since the pseudo-coherent demodulation has an arbitrary phase error of $\phi$ radians, the vector W will have been rotated by $\phi$ relative to the actual carrier vector $Z = X + jY$ for the received TDMA signal. The desired quadrature components X and Y will therefore have been distorted by cross coupling into components U and V. As will be described in detail below, storage of a sufficient number L of the complex demodulator samples W allows the phase error $\phi$ to be estimated in phase estimator 55. The estimate $\hat{\phi}$ may then be used to remove the undesired rotation of the complex signal components delivered from delay devices 60 and 65 in phase corrector 70 to produce corrected vectors $\hat{Z} = \hat{X} + j\hat{Y}$. Binary signal detection is then effected on the corrected vector in detector 75, resulting in an equivalent coherent detection of the received message symbols. Finally, differential decoding may be employed in decoder 80 whenever the phase estimate for coherent detection is obtained from a suppressed carrier MPSK transmission as will be discussed in more detail below.

In the "independent burst" method of carrier phase synchronization that is to be employed, TDMA frame and burst synchronization is assumed to be available in addition to PSK symbol timing. Prior to the processing of each burst, all memory of previous TDMA bursts is erased in phase estimator 55 and PSK symbol detector 75. The circuits are then gated "on" for processing of the new TDMA message burst. During the burst interval, the received MPSK signal will have some average power P. The carrier phase at the receiver will be designated as $\theta_c$, which is assumed to be quasi-constant over any TDMA burst interval. With $\xi$ used to represent the modulation phase shift of the MPSK signal (any of M values) and $\gamma$ the additive noise at the receiver, the received transmission may be represented by:

$$g(t) = \sqrt{2P} \cos(2\pi f_c t - \theta_c - \xi) + \gamma(t).$$

The frequency $f_c$ of the carrier is assumed to be known at the receiver to within a small fraction of the inverse of a burst duration. With $\omega_c = 2\pi f_c$, the MPSK transmission may be resolved into the following quadrature representation:

$$g(t) = \sqrt{2P} [X \cos(\omega_c t - \theta_c) + Y \sin(\omega_c t - \theta_c)] + \gamma(t),$$

where
$X = \cos \zeta$
$Y = \sin \zeta$.

Usually the number M of equally spaced modulation phase angles is an integer power of 2, that is, M = 2, 4, 8, 16, etc. For this restriction of M, $$M = 2^K, K = 1, 2, 3, \ldots.$$

The modulation phase shift may then be expressed as:

$$\zeta = \frac{\pi}{2} \sum_{k=0}^{K-1} \frac{a_k}{2^k}.$$

Here, the coefficients $a_k$ independently take on +1 and −1 values such as to yield the desired phase shift $\zeta$. For the binary case (K = 1), $$\zeta_B = a_0 \frac{\pi}{2} \text{ (BPSK)},$$

and $$X_B = \cos\left(a_0 \frac{\pi}{2}\right) = 0, \text{ and}$$

$$Y_B = \sin\left(a_1 \frac{\pi}{2}\right) = \pm 1.$$

For the quaternary case (K = 2), $$\zeta_Q = a_0 \frac{\pi}{2} + a_1 \frac{\pi}{4} \text{ (QPSK)},$$

and the quadrature components are thus given by:

$$X_Q = \cos\left(a_0 \frac{\pi}{2} + a_1 \frac{\pi}{4}\right) = \pm \frac{\sqrt{2}}{2}, \text{ and}$$

$$Y_Q = \sin\left(a_0 \frac{\pi}{2} + a_1 \frac{\pi}{4}\right) = \pm \frac{\sqrt{2}}{2}.$$

Pseudo-Coherent Demodulation

Voltage controlled oscillator 25 with the correct carrier frequency and an arbitrary phase $\theta_r$ is used as a reference waveform to pseudo-coherently demodulate the received MPSK transmission at mixers 10 and 15. Using vector notation, the received signal G and the pseudo-coherent reference R may be expressed as:

$$G = C_1 e^{-j(\omega_c t - \theta_c - \zeta)} + \gamma, \text{ and}$$

$$R = C_2 e^{-j(\omega_c t - \theta_r)}.$$

Filtering of the I and Q demodulator outputs at filters 30 and 35 is used prior to sampling in order to suppress any output at the second harmonic of the carrier and to maximize the signal-to-noise power ratio (SNR) of the desired outputs. With U used to denote the inphase (I) samples and V the quadrature (Q) samples, the demodulated output can be represented by a vector $W=U=jV$, as given by the product of G and the complex conjugate of R:

$$W = GR^* = Ce^{j(\phi+\zeta)} + \eta,$$

where C is a constant, and $\eta$ is an additive noise variable. Because of the arbitrary phase of the reference that is used for pseudo-coherent demodulation, the demodulation sample vector is rotated by a phase $\phi$ equal to the difference between the received carrier phase and the phase of the reference:

$$\phi = \theta_c - \theta_r.$$

Let the quadrature modulation components X and Y be denoted by a signal vector $Z = X + jY$. Z is related to the modulation phase angle $\zeta$ by:

$$Z = e^{j\zeta}.$$

It follows that the demodulated vector W is simply the input signal vector Z multiplied by a scaling constant C and rotated by $\phi$ radians. With $\eta = u + jv$ used to represent the additive noise vector, and $C \triangleq 1$, $$W = Ze^{j\phi} + \eta.$$

Note that the phase error $\phi$ in demodulation results in cross-coupling of the quadrature input signal components so that they are scrambled by pseudo-coherent demodulation:

$$U = X\cos\phi - Y\sin\phi + u, \text{ and}$$

$$V = Y\cos\phi + X\sin\phi + v.$$

For carrier phase synchronization, an estimate of $\phi$ must be made so that the X and Y components of the signal may be unscrambled and then used for PSK symbol decisions.

Carrier Phase Estimation

Figure 2:
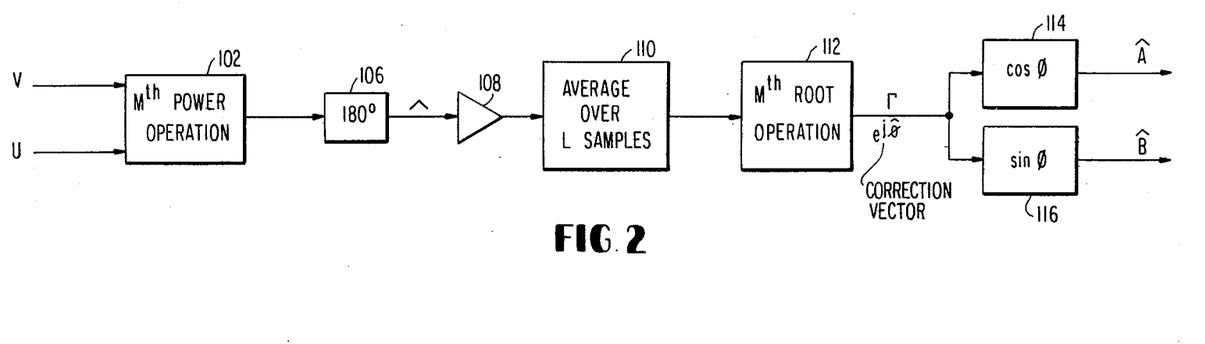
FIG. 2 is a block diagram of the phase estimator of FIG. 1.

An estimation of the undesired phase rotation $\phi$ is performed at baseband by phase estimator 55. This phase estimate $\hat{\phi}$ is obtained by processing the complex demodulator samples W. In this phase estimation, the first requirement is to remove the "random" modulation phase from the samples by raising W to the Mth power. With reference to FIG. 2, the complex components of W are applied to an Mth power device 102 which may be comprised of discrete multiplication circuits or alternatively a programmed microprocessor. Multiplication by $-1$ is also employed at shifter 106 to shift the modulation phase by $\pi$ radians. Neglecting noise, the new vector obtained from W is:

$$\Lambda = W^M e^{j\pi} = C^M e^{jM\phi} e^{j(M\zeta+\pi)}.$$

Note that the Mth-power operation multiplies the modulation phase by M. After multiplication by M and shifting by $\pi$ radians, the modulation phase is then given by:

$$M\zeta + \pi = 2^K\zeta + \pi = \pi\left[1 + \sum_{k=0}^{K-1} a_k 2^{K-1-k}\right].$$

It may be seen that the preceding expression yields a phase angle of 0 on a modulo-$2\pi$ basis. Hence, the modulation has been removed such that:

$$e^{j(M\zeta+\pi)} = e^{j0} = 1.$$

Thus, $$\Lambda = W^M e^{j\pi} = C^M e^{jM\phi}.$$

With a gain adjustment by means 108 such that $C=1$, $$\Lambda = e^{jM\phi}.$$

Noise results in perturbation of $\Lambda$ such that the apparent phase angle has some variance about its mean value of $M\phi$. Both a PLL and a bandpass filter average noise by applying an exponentially decreasing weighting to past history of the signal. However, as derived by J. S. Lee and J. H. Hughen, "An Optimum Phase Synchronizer in a Partially Coherent Receiver," IEEE Transactions on Aerospace and Electronic System," Vol. AE-7, No. 4, July 1971, pp. 652–661, the optimum estimate of phase is obtained by integration of the quadrature components of the signal. The interpretation of this optimization is that when the phase angle can be considered constant during the averaging interval, then all input samples should be equally weighted. Note that equal weighting should be applied to the demodulator samples so that the complex signal is averaged before the phase is determined rather than calculating the phase for each complex sample and averaging these values. Frequency coherence of the demodulator reference and stability of the signal frequency are assumed to yield nearly constant phase over each TDMA burst. Equal weighting of past inputs is therefore performed in averaging device 110. The lowpass method of phase estimation can thus implement optimum phase estimation by averaging $\Lambda$ over some number L of MPSK symbol:

$$\overline{\Lambda} = \frac{1}{L} \sum_{l=1}^{L} \Lambda_l.$$

After this averaging takes place, the phase estimate vector $\Gamma$ is obtained by calculating the Mth root of the smoothed vector in device 112:

$$\Gamma = (\overline{\Lambda})^{1/M} = e^{j\hat{\phi}} = \hat{A} + j\hat{B},$$

were $\hat{A}$ and $\hat{B}$ are estimates of the quadrature components of the received carrier relative to the pseudo-coherent reference:

$A = \cos\phi$, and
$B = \sin\phi$, and are provided in phase angle detectors 114 and 116. The devices 110 and 112 may also be comprised of discrete elements or a programmed microprocessor.

Coherent Detection

After L MPSK symbols have been received and the phase estimate vector $\Gamma$ is computed, the complex conjugate of $\Gamma$ can be used as a correction vector to remove the undesired rotation angle $\phi$ from the demodulator samples. The correction vector yields the same estimate of the transmitted signal vector $Z = X + jy$ that would have been obtained directly with a coherent demodulator:

$$\hat{Z} = \hat{X} + j\hat{Y} = W\Gamma^* = (U + jV)(\hat{A} - j\hat{B}),$$

or $$\hat{X} = U\hat{A} + V\hat{B}$$
$$\hat{Y} = V\hat{A} - U\hat{B}.$$

The two components $\hat{X}$ and $\hat{Y}$ of the signal estimate are used in well known detection means 75 as detection inputs for making decisions on the modulation phase angle $\zeta$ of each PSK symbol. As shown in FIG. 1, there is a storage of L complex demodulator samples in delay means 60 and 65 that allows coherent detection with a delay of L MPSK symbols for the entire TDMA burst by the use of a carrier phase estimate obtained from the first L symbols of the message burst.

Any error in frequency synchronization causes a rotation of the phase of the demodulated phase vector W during each TDMA burst. The assumption of frequency synchronization implies that the rotation angle over any TDMA burst interval is negligible, such as 2 degrees or less. If necessary, the required accuracy in frequency synchronization can be relaxed somewhat by shortening the interval over which a phase estimate is employed for coherent detection. The shortening of this interval can be effected by employing a "sliding-window" estimator in which the carrier phase estimate for coherent detection is always based upon the last L demodulator samples. With this method of updating the phase estimate, the frequency accuracy need only be sufficient to prevent a significant phase rotation over the averaging interval of L PSK symbols.

For the sliding-window estimator, the first L demodulator samples provide the carrier phase estimate for detecting the first PSK symbol of a TDMA burst. Next, the phase estimate is updated so it is based upon the second through the (L+1)th sample. Then the second PSK symbol of the burst is detected. In general, the nth PSK symbol of the burst is detected by using a carrier phase estimate based upon a window of length L, containing the nth to (n+L)th demodulator samples W. This process goes on until $n = L_B - L$, where $L_B$ is the burst length. At this point, the phase estimate based upon the last L demodulator samples in the burst is held and utilized to coherently detect one-by-one the final L PSK symbols.

Updating of the sliding-window estimator can be performed iteratively as follows. First, the average value of the Mth power of the demodulation vectors W is obtained recursively in averaging device 110:

$$\overline{\Lambda}_n = \overline{\Lambda}_{n-1} + \frac{1}{L}(\Lambda_n - \Lambda_{n-L}),$$

where $$\Lambda_n = W_n^M e^{j\pi}.$$

Then the Mth root of $\overline{\Lambda}_n$ is taken in means 112 to obtain the nth phase estimate vector:

$$\Gamma_n = (\overline{\zeta}_n)^{1/M}.$$

Next, the complex conjugate of $\Gamma_n$ is used to remove the undesired phase rotation from the nth demodulator sample:

$$\hat{Z}_n = W_n \Gamma_n^*.$$

Components $\hat{X}_n$ and $\hat{Y}_n$ of the signal estimate $\hat{Z}_n$ for the nth PSK symbol of the TDMA burst are then used to detect the modulation angle $\zeta_n$ for this symbol.

As previously shown, the vector $\zeta$ that was averaged from L symbol durations to reduce the noise was obtained from the Mth power of W in order to remove the phase modulation. Therefore, the Mth root of the average vector must be taken to obtain the phase estimation vector $\Gamma$. Note that there are M roots of $\zeta$, with equal magnitudes and equally spaced phases of $2\pi/M$. Thus, whenever the Mth root is taken to obtain $\Gamma$, the angle selected is arbitrary. A convention can be followed in which the phase angle with the lowest absolute value relative to the phase of the pseudo-coherent reference is chosen. This selection is arbitrary, of course, thereby resulting in an M-state ambiguity in estimating $\phi$. Although the absolute phase is not determined, it will suffice for a coherent reference if the modulation is based upon relative rather than absolute phase. Hence, differential coding as taught by R. W. Lucky, J. Salz and E. J. Weldon, Jr. in *Principles of Data Communication*, McGraw-Hill Book Co., 1968, pp. 247-258, for example, may be employed whenever the phase estimate for coherent detection is obtained from a suppressed-carrier MPSK transmission. Thus, the information bits are conveyed by the relative phases of successive MPSK symbols. The differential decoder 80 determines the K information bits from the successive estimates of the modulation phase $\zeta$, which were obtained by coherent detection. Differential decoding causes paired errors and an approximate doubling of the decision error rate per MPSK symbol. It is possible to avoid these problems by the use of another method of ambiguity resolution in place of differential coding. For instance, a compound unique word can be employed for burst synchronization so that the phase ambiguity can be resolved during unique-word detection by determining the phase rotation of the received word caused by the phase ambiguity of the coherent demodulator. See E. R. Cacciamani and C. J. Wolejsza, "Phase-Ambiguity Resolution in a Four-Phase PSK Communication System", *IEEE Transactions on Communication Technology*, Vol. COM-19, No. 6 December 1971, pp. 1200-1210.

SNR of Carrier Phase Estimate

With regard to the proposed method of carrier phase esimtation, let $\rho$ denote the SNR of the phase estimate $\hat{\phi}$, defined as the inverse of the variance of the error $\epsilon = \phi - \hat{\phi}$ in estimating the phase angle $\phi$. After averaging of additive white Gaussian noise over L MPSK symbols, it can be shown that $$\rho = \mu\Delta(2LE_s/N_o),$$

where $\mu$ denotes the loss in SNR which accompanies the process used for modulation removal, $E_s$ is the received signal energy per MPSK symbol, and $N_o$ is the single-sided noise power density. Thus, $E_s/N_o$ denotes the SNR per MPSK symbol. A factor of 2 appears in the expression for Y because only one-half of the total noise, that which is in phase quadrature with the signal, contributes to the error in phase estimation. Averaging over L symbols increases the SNR by a factor of L. The factor $\mu \leq 1$ is used to account for a loss in SNR that accompanies the nonlinear operation used for modulation removal. This loss results from extra terms generated by cross-products of signal and noise in the Mth-power operation. Any loss from filter mismatch is accounted for by the factor $\Delta \leq 1$. The variance of the error $\epsilon$ in the phase estimate $\phi$ is the inverse of $\rho$:

$$\sigma_\phi^2 = E[\epsilon^2] = E[(\phi - \hat{\phi})^2] = \frac{1}{\rho}.$$

Mth-order multiplication for modulation removal can cause a large loss in SNR for the carrier phase estimate if the SNR prior to modulation removal is much smaller than 10 dB. Therefore, prefiltering of the signal to a noise bandwidth of $B_n$ that is not much larger than the digital symbol rate $R_s$ should be used to reduce the loss that accompanies modulation removal. If the received signal has rectangular shaping of its binary components, then the minimum noise bandwidth can be achieved by integration over the symbol interval prior to modulation removal. In general, matched filtering will yield the maximum SNR for any signal. The loss factor associated with squaring for the removal of BPSK modulation can be shown to be:

$$\mu_B = \frac{1}{1 + 0.5\lambda},$$

where $$\lambda = \frac{1}{\Delta E_s/N_o}.$$

For other than matched filtering, the noise bandwidth $B_n$ will ordinarily have to be somewhat larger than the symbol rate $R_s$ in order to prevent significant truncation of the signal spectrum, and $\Delta < 1$ results. It is assumed that the signal attenuation is negligible. The intersymbol interference caused by filtering will also cause a loss in SNR, but this degration of performance is highly dependent upon many factors, such as filter type and pulse shape, and cannot therefore be determined for a general case.

The fourth-power operation used to remove QPSK modulation can be shown to result in the following loss factor:

$$\mu_Q = \frac{1}{1 + 4.5\lambda + 6\lambda^2 + 1.5\lambda^3}.$$

Stiffler has derived the loss for the general case of Mth-order multiplication for MPSK removal. See J. J. Stiffler, *Theory of Synchronization Communications*, Prentice-Hall, 1971, p. 261. The result by Stiffler is for the special case of matched filtering prior to modulation removal. However, by replacing $E_s/N_o$ by $1/\lambda$, the results are extended to prefiltering with any mismatch factor. Therefore, the loss for MPSK modulation removal is:

$$\mu_M = \frac{1}{\frac{1}{M^2} \sum_{m=1}^{M} \binom{M}{m}^2 m! (0.5\lambda)^{m-1}}.$$

It is also possible to utilize PSK symbol decisions to remove the modulation on a delayed input to the carrier phase estimator. See W. C. Lindsey and M. K. Simon, *Telecommunication Systems Engineering*, Prentice-Hall, 1973, pp. 75-80. After a steady-state in synchronization has been achieved, this method of decision feedback (DFB) for modulation removal would result in a smaller loss that the Mth-power operation. However, in the carrier synchronization technique in accordance with the present invention, phase acquisition is the major concern. Furthermore, DFB is not feasible for modulation removal during the acquisition interval.

Required Storage and Delay

For a specific value of $P_b(\epsilon)$, the average probability of decision error per information bit, ideal coherent detection of an MPSK signal has a corresponding $E_b/N_o$ requirement. Detection curves for ideal coherent MPSK signalling are shown in many publications, including J. J. Jones, *Modern Communication Principles*, McGraw-Hill Book Co,m 1967, p. 294; P. F. Panter, *Modulation, Noise and Spectral Analysis*, McGraw-Hill Book Co., 1965, p. 721; and W. C. Lindsey and M. K. Simon, *Telecommunication System Engineering*, Prentice-Hall, 1973, p. 332. Because the phase reference used for coherent detection is imperfect for any practical receiver, the $E_b/N_o$ requirement for a given $P_b(\epsilon)$ is increased relative to that shown by ideal detection curves. The necessary increase in $E_b/N_o$ to maintain the desired $P_b(\epsilon)$ is referred to as the detection loss caused by a noisy phase reference. The detection loss has been obtained for both BPSK and QPSK as a function of $P_b(\epsilon)$ and $\rho$, the SNR ratio to the noisy phase reference. See S. A. Rhodes, "Effect of Noisy Phase Reference on Coherent Detection of Offset-QPSK Signals," *IEEE Transactions on Communications*, Vol. 22, No. 8, pp. 1046–1055, August 1974. When $\rho$ is sufficiently high to yield efficient detection, the small loss in detection caused by a noisy phase reference may be approximated for the BPSK and QPSK cases by:

$$L(\text{dB}) \approx \begin{cases} \frac{4.34}{\rho} & \text{BPSK} \\ \frac{4.34}{\rho}\left(1 + 2\frac{E_b}{N_o}\right) & \text{QPSK} \end{cases}$$

It is desirable to obtain a SNR $\rho$ in carrier phase synchronization that will provide nearly ideal detection performance. For an upper bound of 0.2 dB on the detection loss, $10 \log \rho = 13$ dB will be required for BPSK. However, the corresponding requirement for QPSK is greater than 20 dB. In general, the SNR requirement $\rho$ increases with M, the number of signalling phases for the PSK transmission, when $E_b/N_o$ and L are held constant. For the proposed synchronization technique to be applied, the TDMA burst length must be at least as large as the required number L of PSK symbols over which the noise must be averaged to obtain the desired SNR $\rho$ of the phase estimate. Neglecting implementation losses, the required storage and detection delay L for the proposed synchronization technique are given in terms of $\rho$ and $E_b/N_o$ by:

$$L = \frac{\rho}{2\mu\Delta JE_b/N_o},$$

where J is the number of information bits conveyed by each MPSK symbol:

$$K = \log_2 M.$$

As previously explained, extra noise terms are generated in the Mth-power process for crossproducts of signal and noise. These extra noise terms can cause a SNR loss of $-10 \log \mu$ for modulation removal that is very large when $E_b/N_o$ is low and $M>2$. Thus, this loss can result in very large requirements on L at low $E_b/N_o$ when $M=4$ or 8. Consequently, the required storage L may be much greater as M in increased.

Besides the requirements for efficient detection, the minimum SNR $\rho$ for the phase reference may also have to be increased for large values of M for another reason. The Mth-power operation multiplies any phase error from noise by a factor of M, which divides the SNR by a factor $M^2$. After averaging over L symbols, this SNR is in theory recovered by an Mth-root operation that divides the phase error by a factor of M. But the SNR prior to the Mth-root operation must be greater than 10 dB in order to provide a reliable reference. Hence, $\rho$ must be at least 20 log M+20 dB for reliable carrier synchronization. Therefore, even if $\mu$ did not change with M, the required L value would be proportional to $M^2$. If the required L is less than the burst length, then this method of carrier synchronization without a preamble can be used.

Required Frequency Stability

Let $\tau$ denote the interval of time between the reception of the oldest input sample to the phase estimator and the last MPSK symbol which is to be coherently detected with the reference estimate. As discussed above, there are two options for the proposed method of carrier phase synchronization. In the first option, a phase estimate obtained from the first L PSK symbols of the TDMA burst is used to coherently detect the entire burst. Hence, $\tau = L_B/R_s$ for this option, where $L_B \geq L$ is the burst length and $R_s$ is the MPSK symbol rate. A sliding-window estimator is used in the second option, so that coherent detection is always made with a phase reference obtained from the preceding L symbols. Therefore, $\tau = L/R_s$ for the second option. Frequency synchronization of the pseudo-coherent reference must be provided with sufficient accuracy at the receiving terminal so that the phase error $\phi$ in demodulation is nearly constant during any interval of duration $\tau$. A maximum phase change of $\pi/100$ radians or 1.8 degrees could reasonably be tolerated. The corresponding bound on the frequency error $\epsilon_f$ would then be given by:

$$\epsilon_f \leq \frac{\Delta\phi \text{ max}}{2\pi\tau} = \frac{\pi/100}{2\pi\tau} = \frac{1}{200\tau}.$$

As an example, assume a digital symbol rate of $R_s = 10$ Mbit/s and an interval $\tau$ corresponding to 100 PSK symbols, $\tau = 10^{-5}$. The frequency of the reference must then be maintained within $\pm 500$ Hz of the received carrier frequency $$\epsilon_f \leq \frac{1}{200 \times 10^{-5}} = 500 \text{ Hz}.$$

Either doppler shifts or oscillator frequency drifts may make it necessary for the receiver to track the long-term average frequency of the PSK carrier with automatic frequency control (AFC). There will then be two sources of frequency error for the pseudo-coherent demodulator reference: short-term oscillator instability and AFC tracking error. Assuming that the short-term oscillator will at worst have a standard deviation of only one half of the total allowable error in frequency synchronization, when the frequency is averaged over an interval $\Delta$, the short-term instability should not result in a frequency variation from the long-term average any greater than the bound:

$$\sigma_f(\tau) \leq \frac{1}{400\tau}.$$

The allowable oscillator instability in terms of the fractional frequency departure is defined by:

$$S_f(\tau) \triangleq \frac{\sigma_f}{f_o} = \frac{1}{400 f_o \tau}.$$

The most critical case for oscillator stability is the highest carrier frequency. For a 6/4 GHz satellite line, then $f_o = 6 \times 10^9$ is the critical number. Thus, $$S_f(\tau) = \frac{1}{400 \times (6 \times 10^9) \times \tau} = \frac{4 \times 10^{-13}}{\tau}.$$

The required short-term stability would be difficult to achieve for an entire TDMA frame unless its duration is much less than a second. For the phase estimator under consideration, the required short-term stability should be met without undue difficulty. With the example of $\tau = 10^{-5}$ seconds, the allowable frequency error is greater than 1 part in $10^8$:

$$S_f(\tau) \leq \frac{4 \times 10^{-13}}{\tau} = \frac{4 \times 10^{-13}}{10^{-5}} = 4 \times 10^{-8}.$$

Figure 3:
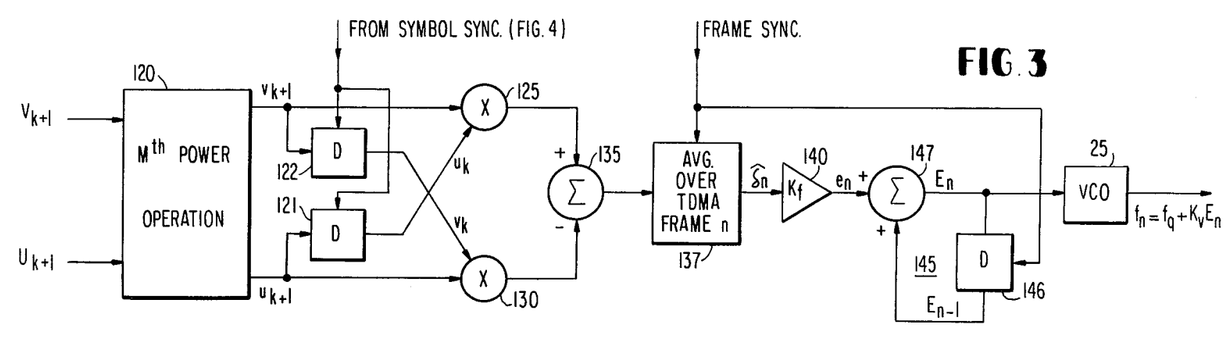
FIG. 3 is a block diagram of the automatic frequency control circuit of FIG. 1.

Considering how the carrier frequency may be tracked, let the carrier frequency $f_c$ of the received MPSK/TDMA transmission be denoted by a constant F. With reference to FIG. 3, AFC may be implemented by using a voltage-controlled oscillator (VCO) 25 (See FIG. 1) to provide the pseudo-coherent demodulator reference. The frequency of the pseudo-coherent reference is denoted by a variable f. With n used as a subscript for the nth TDMA frame, the error in frequency synchronization provided by averaging device 137 during the nth frame is:

$$\delta_n = F - f_n.$$

The AFC circuit of FIG. 3 can be employed to supply a control voltage $E_n$ for the VCO input. The VCO frequency is shifted linearly by the control voltage away from the quiescent frequency $f_q$:

$$f_n = f_q + K_v E_n,$$

where $K_v$ is a VCO constant.

During each TDMA frame the AFC circuit is provided with an estimate $\hat{\delta}_n$ of the error in frequency synchronization, which can be derived from the message burst of the MPSK transmission. A voltage $e_n$ that is proportional to $\hat{\delta}_n$ is generated at the output of adjustable amplifier 140 having gain $K_f$:

$$e_n = K_f \hat{\delta}_n.$$

This voltage can then be used in recursive filter 145 to update the control voltage once per TDMA frame, where $$E_n = E_{n-1} + e_n.$$

The iterative updating of E results in a similar recursive equation for the VCO reference frequency:

$$f_n = f_{n-1} + \Delta_n,$$

where $$\Delta_n \triangleq K_v e_n = K_v K_f \hat{\delta}_n$$

where $K_e$ is a gain parameter of the loop filter.

Without loss of generality in the analysis, it may be assumed that $K_f = 1$. Then manipulation of the recursive relationship for $f_n$ yields the difference equation for a first-order discrete tracking loop:

$$f_n = (1 - K_v) f_{n-1} + K_v \hat{F}_{n-1},$$

where $F_{n-1}$ is the estimate of the carrier frequency obtained during the $(n-1)$th TDMA frame:

$$\hat{F}_{n-1} = f_{n-1} + \hat{\delta}_{n-1}.$$

In the absence of noise $\delta_n = \delta$ and $F_n = F$. Solution of the first-order difference equation then reveals the acquisition performance of the AFC loop:

$$f_n = (1 - K_v)^n f_0 + [1 - (1 - K_v)^n] F.$$

For a sufficiently low gain constant $K_v$, $$f_n \approx e^{-nK_v} f_0 + (1 - e^{-nK_v}) F.$$

Thus, the AFC loop, which may be updated once per TDMA frame, has a time constant of $1/K_v$ frame intervals.

It is fairly easy to obtain the steady-state tracking variance $\sigma_f^2$ for the AFC loop as a function of the variance $\sigma_e^2$ of the error $\delta - \hat{\delta}$ in the estimate of $\delta$ that is obtained during each TDMA burst of the appropriate MPSK transmission. First, note that the loop equation may be written in terms of the tracking error $\delta$:

$$\delta_{n+1} = \delta_n (1 - K_v) + (\delta_n - \hat{\delta}_n) K_v$$

But $$\sigma_f^2 = E[\delta_n^2] = E[\delta_{n+1}^2].$$

Therefore, squaring of both sides of the loop equation and taking the expected values yields:

$$\sigma_f^2 = \frac{K_v^2}{1 - (1 - K_v)^2} E(\delta_n - \hat{\delta}_n)^2 \cong \frac{K_v}{2} \sigma_\delta^2$$

After pseudo-coherent demodulation, the demodulated vector W is obtained. When W is raised to the Mth power to effect removal of the M-phase modulation, the vector $\Lambda$ is obtained. It will now be shown now the $\Lambda$ vectors obtained during each TDMA/MPSK burst may be used to derive an estimate $\hat{\delta}_n$ of the error in carrier frequency synchronization. First, define $\Lambda$ by its quadrature components, u and v.

$$\Lambda = W^M e^{j\pi} = u + jv$$

where $$u = C^M \cos(M\phi)$$

$$v = C^M \sin(M\phi)$$

Note that:

$$u \frac{dv}{dt} - v \frac{du}{dt} = MC^{2M} \frac{d\phi}{dt}$$

But the rotational velocity of the phase error $\phi$ is related to the error $\delta$ in frequency by:

$$\delta = \frac{1}{2\pi} \frac{d\phi}{dt}$$

Thus, in the absence of noise, $$\delta = \frac{1}{2\pi MC^{2M}} \left[ u \frac{dv}{dt} - v \frac{du}{dt} \right]$$

One value each of u and v is obtained for each demodulated MPSK symbol. For discrete samples, $$u \frac{dv}{dt} - v \frac{du}{dt} \rightarrow u_k \frac{v_{k+1} - v_k}{T} - v_k \frac{u_{k+1} - u_k}{T},$$

Where T is the symbol period and k denotes the samples for the kth symbol interval of a TDMA burst. With cancellation of $-u_k v_k$ and $v_k u_k$, the estimate $\hat{\delta}_n$ of frequency error may be obtained in averaging device 137 during the MPSK burst for the nth frame according to:

$$\hat{\delta}_n = K_o \sum_{k=1}^{L_B} (u_k v_{k+1} - v_k u_{k+1}),$$

where $L_b$ is the number of MPSK symbols in a TMDA burst. The delay means 121 and 122 delay the u and v components by one symbol interval to provide appropriate signals to mixers 125 and 130. The mixers thereby provide the signals $u_k v_{k+1}$ and $v_k u_{k+1}$ to the subtractor 135, the output of which is delivered to averaging device 137 which produces $\hat{\delta}_n$.

Symbol Synchronization

Symbol timing must be available in order to determine the correct sampling instants for the complex signal W obtained from the pseudo-coherent demodulator. For TDMA without synchronization preambles, this timing must be obtained from previous bursts of the same transmision. Frequency stability is usually adequate for coherence of symbol phase to be realized over many consecutive TDMA frames. Therefore, a symbol timing waveform of high quality may be derived by averaging the symbol phase of the received TDMA/MPSK transmission over many TDMA frames. This averaging may be accomplished by the use of a gated PLL.

Figure 4:
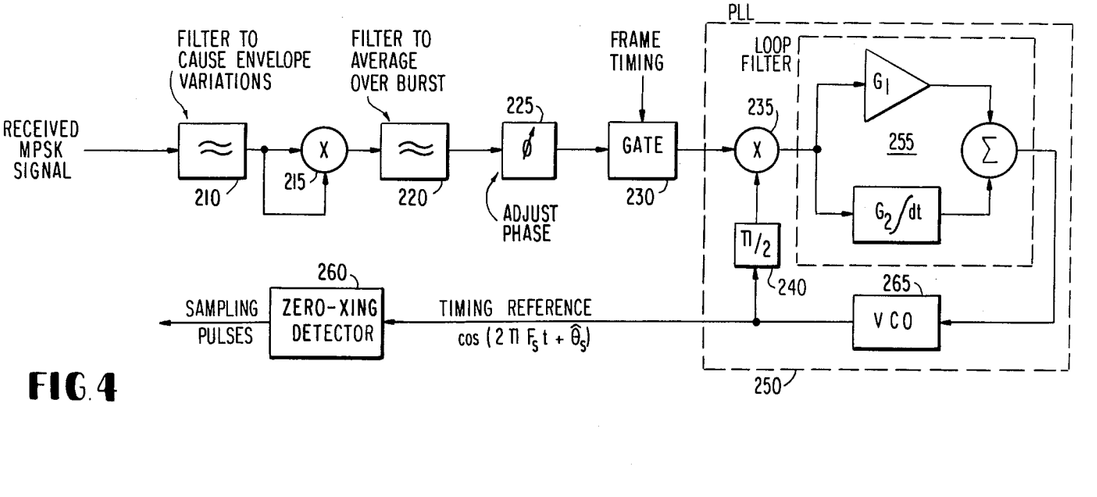
FIG. 4 is a block diagram of the inertial type symbol synchronizer of FIG. 1.

FIG. 4 illustrates a symbol synchronization circuit 40 (see FIG. 1) compatible with the technique of carrier synchronization which does not require a synchronization preamble. The symbol synchronizer operates in a gated mode, in which the symbol phase is updated once per TDMA frame during reception of the appropriate burst and maintained inertially or "flywheeled" during the interburst intervals. The method of symbol synchronization is noncoherent with respect to carrier phase so that the carrier phase does not have to be known in order to achieve symbol phase synchronization.

The received MPSK transmission is applied to narrow band pass filter 210 in order to create large envelope fluctuations in the regions of phase transitions for the MPSK transmission. Signal squaring is employed at mixer 215 to obtain a signal that is useful for symbol timing. While the synchronizer is illustrated as taking its input directly from the IF signal, it can alternatively apply the baseband quadrature outputs to a device for producing the signal $I^2 + Q^2$. This signal would be applied directly to the tuned filter 220.

For each phase transition, the squared signal produces one cycle of a wave with the frequency $R_s$ and phase $\theta_s$ of the MPSK symbols. The tuned filter 220 at a frequency $f_o = R_s$ is used to sustain an output with the proper phase. At the end of each burst, the filter output provides a noisy input for the gated PLL. The time constant of filter 220 should include many MPSK symbol intervals but be short compared to a TDMA frame interval. Consequently, the filter 220 will sustain an oscillation for many symbol intervals after each burst, but the filter output will also almost completely decay before the next burst of the same TDMA transmission arrives.

The output of filter 220 is applied to variable phase shifter 225 which provides manual control of absolute sample pulse timing. The phase adjusted signal is gated to phase locked loop 250 through gate 230 which receives an approximate frame timing pulse in a well known manner. The PLL output provides a timing reference signal to zero crossing detector 260, which in turn supplies symbol sampling pulses to the appropriate portions of the receiver unit as shown in FIG. 1.

The large envelope fluctuations in MSK transition regions caused by filter 210 may be crudely represented as cosinusoidal in shape with a peak value V that can take on either a positive or negative polarity. The amplitude of V increases with the value of phase shift, being greatest for a phase change of $\pi$ radians between the modulation angles $\xi_n$ and $\xi_{n+1}$ of successive MPSK symbols. Besides envelope fluctuations, phase transitions also produce frequency shifts $f_n$ for bandlimited signals. Hence, the bandlimited MPSK signal will have components that may be represented mathematically as:

$$S(t) = \pm V \cos(\omega_r t + \theta_r) \cos(\omega_c t + \theta_c - \xi_n + \omega_n t + \theta_r),$$

where the frequencies $f_r = \omega_r/2\pi$ and $f_n = \omega_n/2\pi$ are related to the MPSK symbol rate $R_s$ by:

$$f_r = \frac{R_s}{2}$$

$$f_n = \frac{(\xi_{n+1} - \xi_n) \bmod \pi}{2\pi/R_s}.$$

Note that the phase shift $\xi_{n+1} - \xi_n$ is expressed as modulo $\pi$ in determining $f_n$, since a phase shift of $\pi$ radians is a polarity reversal and does not yield a frequency shift.

Squaring of the signal produces components at the sum and difference of carrier and envelope frequencies. The lower sideband (LSB) is the desired component for symbol synchronization. Let the symbol phase be denoted by $\theta_3 = 2\theta_r$. Then, the LSB of the square of a tightly filtered MPSK symbol yields the following component at $2f_r = R_s$ that is useful for symbol synchronization:

$$LSB[s^2(t)] = \frac{V^2}{4} \cos(2\omega_r t + 2\theta_r) = \frac{V^2}{4} \cos(2\pi R_s t + \theta_s).$$

The output of VCO 265 provides a waveform that has the necessary flywheel properties for the symbol synchronizer, and the input allows the output phase to be adjusted by controlling the frequency. The VCO provides automatic control of the phase of the symbol reference. The control voltage that is input to the VCO is obtained in the PLL by 90° phase shifter 240 and phase detector 235 which compares the phase of the waveform obtained from the tuned filter with the phase of the VCO reference. In practice, phase detector 235 is usually a product device, for which the output is proportional to the sine of the phase difference. In the steady-state or tracking mode of operation, the phase error is small. Consequently, the sine of the phase error in tracking is a good approximation of the phase error. The output of detector 235 is applied to second order filter 255.

The PLL input is provided by the tuned filter 220 once per TDMA frame interval by virtue of timing gate 230. The output of the tuned filter is gated into the PLL for an interval of several symbols at the end of each burst of the same transmission. Prior synchronization information and updating of synchronization information is provided by the PLL circuitry which generates the VCO input control voltage. By the selection of low gain or corresponding narrow bandwidth for the PLL, only small corrections of symbol phase can be made during each frame interval.

Implementation Considerations

The proposed technique of carrier phase synchronization averages noise over some number L of PSK symbol intervals to obtain the coherent phase reference. Because QPSK is more sensitive than BPSK to a noisy phase reference, the required SMR $\rho$ of the reference is greater for the quaternary case. The restriction of small losses relative to ideal coherent detection requires a $\rho$ value of 13 dB or more for BPSK and in excess of 20 dB for QPSK. Therefore, the minimum length L required for the TDMA burst to be used as its own carrier phase preamble is significantly different for the binary (BPSK) and quaternary (QPSK) cases. For instance, L=10 symbol intervals may suffice for BPSK, but L=30 may be required for QPSK when the ratio $E_b/N_o$ of available signal energy per bit to noise power density is sufficiently high to yield an uncoded bit error probability of $10^{-4}$ or less. The required lengths are greatly increased when reliable carrier phase synchronization is desired at low $E_b/N_o$ values. Because of the minimum requirement on burst length, the technique of coherent detection without a preamble in accordance with the present invention is not applicable when very short burst lengths are used. If the TDMA bursts are very long, such as several thousands of symbols, the use of a carrier preamble would not result in a significant loss in frame efficiency. Consequently, the new technique is appropriate for bursts of medium length, that is, in the range of 25 to 500 symbols.

One telephone channel of 4 kHz bandwidth will require 64,000 bits per second for 8-bit PCM. Thus, in a TDMA system that has a frame duration of 750 $\mu$s, 48 bits per telephone channel must be transmitted during each TDMA frame, Let $N_c$ denote the number of telephone channels to be transmitted in a single TDMA burst. Assume that $E_b/N_o$ is sufficiently high to provide an uncoded bit error probability of $10^{-4}$ or less. If a preamble were utilized, 30 QPSK symbols or 60 bits would be a typical overhead requirement for carrier synchronization. Therefore, the efficiency of burst utilization for communications based upon the carrier preamble alone would be:

$$\eta_B = \frac{48N_c}{48N_c + 60} = \frac{1}{1 + 1.25/N_c}$$

If $N_c \geq 10$ channels, then a carrier preamble of length $L=30$ would not result in a significant loss of efficiency. Therefore, the carrier phase synchronization technique in accordance with the present invention would be feasible if typical transmission bursts contained less than 10 channels or if L is increased to a much larger value in order to accomodate operation at low $E_b/N_o$. The single-channel-per-carrier transmissions (SCPC) via satellite TDMA would be good candidates for the new synchronization technique.

While the phase estimator 55, phase corrector 70 and delay devices 60 and 65 have been illustrated and described as discrete and separate elements, they may alternatively be incorporated into a single microprocessor as a matter of choice.

Various changes, additions and omissions of elements may be made within the scope and spirit of this invention. It is to be understood that the invention is not limited to specific details, examples and preferred embodiments shown and described herein.

I claim:

1. An apparatus for providing coherent detection of a series of data bursts, each burst of said series having a modulation imparted thereon to provide a plurality of symbols, said series of bursts having a first repetition rate and a signal carrier with a first relative phase and said plurality of symbols having a second repetition rate, said apparatus comprising:

automatic frequency control means;

variable frequency oscillator means responsive to said automatic frequency control means, for providing a local oscillator signal with a second relative phase;

means responsive to said local oscillator signal for demodulating each said data burst so as to provide a pair of baseband signals in phase quadrature;

timing means for providing said second repetition rate;

sampling means responsive to said timing means for sampling said pair of baseband signals at said second repetition rate to provide a pair of baseband samples;

phase estimation means for receiving said pair of baseband samples to provide an approximate indication of the difference between said first and second relative phases in response to said baseband samples, said phase estimation means producing said approximate indication after a predetermined time delay;

delay means for receiving and delaying said pair of baseband samples by approximately said predetermined time delay to provide a pair of delayed samples; and means for correcting the value of said delayed samples in accordance with said approximate indication, whereby said series of data bursts are coherently detected.

2. The apparatus of claim 1 wherein said phase estimation means comprises an Mth power means for receiving and raising said pair of baseband samples to the Mth power to provide Mth power signals, means for receiving and inverting the phase of said Mth power signals to provide inverted signals, averaging means for receiving and averaging said inverted signals over said predtermined time delay to provide averaged signals, and Mth root means for receiving said averaged signals for providing the Mth root thereof, said Mth root representing said approximate indication of said difference between said first and second relative phases.

3. The apparatus of claim 2 wherein said modulation imparted on said series of data bursts is M-state phase shift keying defined as:

$$A \cos(\omega_c t - \theta_c - \zeta)$$

where A is signal amplitude, $\omega_c$ is the frequency of said signal carrier, $\theta_c$ is said first relative phase, $\zeta$ is said modulation imparted on said series of data bursts and defined as:

$$\zeta = \frac{\pi}{2} \sum_{k=0}^{K-1} \frac{a_k}{2^k},$$

where $M=2^k$, K is an integer, $a_k$ independently takes values $\pm 1$, wherein said Mth-power means raises said pair of baseband samples to the $Mth=2^k$ power.

4. The apparatus of claim 2 wherein said averaging means provides an equal weighted average of L symbols, wherein L is defined as:

$$L \approx \frac{\rho}{2\mu\Delta JE_b/N_o} = \frac{\rho}{2\mu E_s/N_o},$$

where $\rho$ is the desired signal-to-noise ration, $\mu$ denotes the loss in SNR which accompanies the process used for modulation removal, J is the number of bits of information conveyed by each symbol, $\Delta$ represents a loss from filter mismatches, $E_s/N_o =$ is the ratio of signal energy per symbol to noise power density, and $E_b/N_o$ is the ratio of signal energy per bit to noise power density.

5. The apparatus of claim 1 wherein said automatic frequency control means comprises:

Mth power means for receiving and raising said pair of baseband samples to the Mth power to provide first and second Mth power signals;

first and second delay means for receiving said first and second Mth power signals, respectively, for providing first and second delayed Mth power signals;

first multiplying means for multiplying said first Mth power signal with said second delayed Mth power signal;

second multiplying means for multiplying said second Mth power signal with said first delayed Mth power signal;

subtractor means receiving and providing the difference between the outputs of said first and second multiplying means;

averaging means for averaging said difference for providing an average difference signal; and filter means receiving said average difference signal for providing an input to said variable frequency oscillator means.

6. The apparatus of claim 5 wherein said first and second delay means provide a delay in time approximately equal to the duration of a single symbol.

7. The apparatus of claims 5 or 6 wherein said averaging means averages over a single burst.

8. The apparatus of claim 7 wherein said filter means is a recursive filter having a loop delay of approximately one burst.

9. The apparatus of claim 1 wherein said timing means comprises:
  means for producing a sum of squares of said baseband signals;
  means for applying the sum of the squares of said baseband signals to a tuned filter to provide a tuned signal from said tuned filter;
  means for gating said tuning signal at said first repetition rate to provide a gated signal;
  phase-locked-loop means receving said gated signal for providing a phase-locked signal; and
  zero-crossing detecting means receiving said phase-locked signal for providing an output at said second repetition rate.

10. The apparatus of claim 9 wherein said means for producing the sum of the squares of said baseband signals comprises:
  a narrow bandpass filter receiving said data bursts to provide a tightly filtered signal; and
  means for squaring said tightly filtered signal.

11. A process for providing coherent detection of a series of data bursts, each burst of said series having a single carrier and a plurality of symbols received at a symbol rate, said process comprising:
  applying said data bursts to a pair of demodulators;
  applying a frequency controlled local oscillator signal to said pair of demodulators to thereby provide a pair of quadrature signals at baseband;
  sampling said pair of quadrature signals at said symbol rate, and applying said sampled pair of quadrature signals to a phase estimator;
  estimating the phase difference between said signal carrier and said local oscillator signal in said phase estimator, said phase estimator inherently delaying said estimation of phase difference, and
  delaying said sampled pair of quadrature signals by a delay approximately equal to said inherent delay of said quadrature phase estimator, and providing a delayed quadrature output to a phase corrector;
  correcting the delayed quadrature output in accordance with said estimation of phase difference to thereby provide coherent detection of said data bursts.

12. The process of claim 11 wherein estimating said phase differences in said phase estimator comprises:
  raising said sampled pair of quadrature signals to a predetermined power to provide a first signal;
  inverting said first signal to provide a second signal;
  averaging said second signal to provide a third signal; and
  taking a predetermined root of said third signal, corresponding to said predetermined power, to provide said estimation of phase difference.

13. An apparatus for removing random modulation from a M-state phase shift keyed signal represented by two baseband signals in phase quadrature and defined as:

$$A \cos(\omega_c t - \theta_c - \zeta)$$

where A is signal amplitude, $\omega_c$ is the frequency of the signal carrier, $\theta_c$ is an arbitrary phase, is said random modulation imparted on said series of data bursts and defined as:

$$\zeta = \frac{\pi}{2} \sum_{k=0}^{K-1} \frac{a_k}{2^k},$$

where $M = 2^K$, K is an integer, and $a_k$ independently takes values $\pm 1$, said apparatus comprising:
  an Mth power means for receiving and raising samples of said pair of baseband signals to the Mth power to provie Mth power signals, means for receiving and inverting the phase of said Mth power signals to provide inverted signals, means for receiving and averaging said inverted signals to provide averaged signals, and Mth root means for receiving said averaged signals for providing the Mth root thereof, said Mth root being independent of said random modulation $\zeta$.

14. An apparatus for automatically frequency tracking the carrier frequency $\omega_c$ of an M-state PSK signal represented by two baseband signals in phase quadrature and defined as:

$$A \cos(\omega_c t - \theta_c - \zeta)$$

where A is signal amplitude, of $\theta_c$ is an arbitrary phase and $\zeta$ is a phase modulation defined as:

$$\zeta = \frac{\pi}{2} \sum_{k=0}^{K-1} \frac{a_k}{2^k},$$

where $M = 2^k$, K is an integer, and $a_k$ independently takes values $\pm 1$, said apparatus comprising:
  Mth power means for receiving and raising samples of said pair of baseband signals to the Mth power to provide first and second Mth power signals;
  first and second delay means for receiving said first and second Mth-power signals, respectively, for providing first and second delayed Mth power signals;
  first multiplying means for multiplying said first Mth power signal with said second delayed Mth power signal;
  second multiplying means for multiplying said second Mth power signal with said first delayed Mth power signal;
  subtractor means receiving and providing the difference between the outputs of said first and second multiplying means;
  averaging means for averaging said difference for providing an average difference signal; and filter means receiving said average difference signal for providing a signal to a variable frequency oscillator means.

15. In an apparatus for providing coherent detection of a series of data bursts, each burst of said series having a modulation imparted thereon to provide a plurality of symbols, said series of bursts having a first repetition rate, said plurality of symbols having a second repetition rate, means for providing a symbol synchronization signal at said second repetition rate comprising:

means for providing a pair of baseband quadrature signals representing said data bursts;
means for producing a sum of squares of said baseband signals;
means for applying the sum of the squares of said baseband signals to a tuned filter to provide a tuned signal from said tuned filter; means for gating said tuned signal at said first repetition rate to provide a gated signal; phase-locked-loop means receiving said gated signal for providing a phase-locked signal; and zero crossing detecting means receiving said phase-locked signal for providing said symbol synchronization signal at said second repetition rate.

16. The apparatus of claim 15 wherein said means for producing the sum of the squares of said baseband signals comprises:

a narrow bandpass filter receiving said data bursts to provide a tightly filtered signal; and
means for squaring said tightly filtered signal.

* * * * *

UNITED STATES PATENT AND TRADEMARK OFFICE
CERTIFICATE OF CORRECTION

PATENT NO. : 4,466,108
DATED : August 14, 1984
INVENTOR(S) : Smith A. RHODES

It is certified that error appears in the above-identified patent and that said Letters Patent is hereby corrected as shown below:

Column 1, line 7, "in" should be --is--.

Column 2, line 37, "TDMA/MPS" should be --TDMA/MPSK--;

line 62, "procesing" should be --processing--.

Column 3, line 2, delete "¢" before "pseudo" and insert --"--.

Column 9, line 14, "muchlarger" should be -- much larger--.

Column 10, line 16, "Co,m" should be --Co.,--.

Column 14, line 57, "transmision" should be --transmissions--.

Column 15, line 50, "bandlimitedMPSK" should be --bandlimited MPSK--.

UNITED STATES PATENT AND TRADEMARK OFFICE
CERTIFICATE OF CORRECTION

PATENT NO. : 4,466,108

DATED : August 14, 1984

INVENTOR(S) : Smith A. RHODES

It is certified that error appears in the above-identified patent and that said Letters Patent is hereby corrected as shown below:

Column 16, line 5, "symbol 3" should be --symbol s--.

Column 17, line 27, "accomodate" should be --accommodate--.

Column 18, line 49, "ration" should be --ratio--.

Column 20, line 27, "provie" should be --provide--.

Signed and Sealed this

Second Day of April 1985

[SEAL]

Attest:

DONALD J. QUIGG

Attesting Officer

Acting Commissioner of Patents and Trademarks